S. F. MILLER.
APPARATUS FOR DISCHARGING THE CONTENTS OF SEPTIC OR SETTLING TANKS AND THE LIKE.
APPLICATION FILED APR. 25, 1908.
904,141.
Patented Nov. 17, 1908.
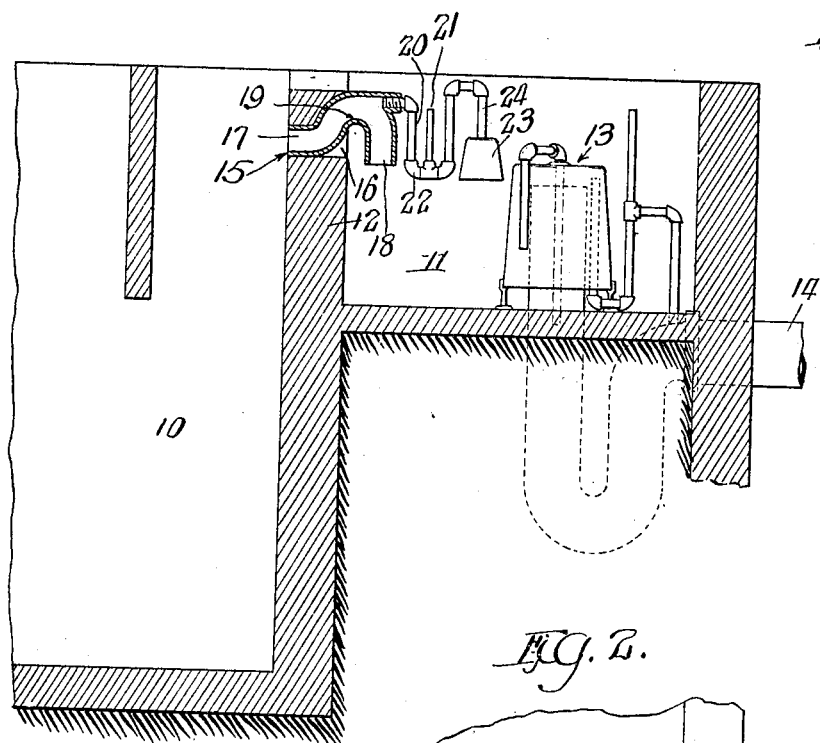
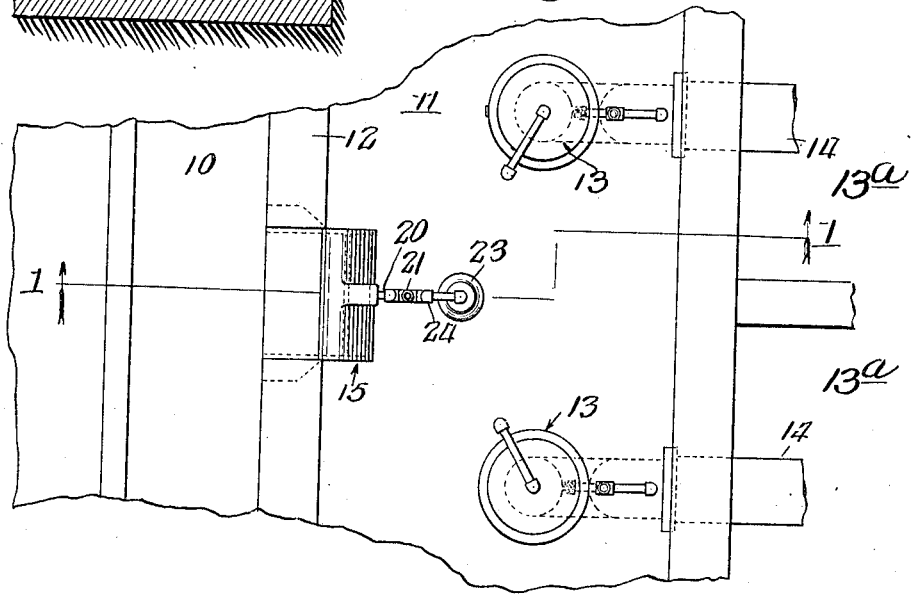

UNITED STATES PATENT OFFICE.

SAMUEL FISHER MILLER, OF CHICAGO, ILLINOIS.

APPARATUS FOR DISCHARGING THE CONTENTS OF SEPTIC OR SETTLING TANKS AND THE LIKE.

No. 904,141.      Specification of Letters Patent.     Patented Nov. 17, 1908.

Application filed April 25, 1908. Serial No. 429,253.

*To all whom it may concern:*

Be it known that I, SAMUEL FISHER MILLER, a citizen of the United States, and a resident of Chicago, in the county of Cook and State of Illinois, have invented certain new and useful Improvements in Apparatus for Discharging the Contents of Septic or Settling Tanks and the Like; and I do hereby declare that the following is a full, clear, and exact description thereof, reference being had to the accompanying drawings, and to the letters of reference marked thereon, which form a part of this specification.

This invention relates to improvements in apparatus for controlling the flow of liquid from a septic or settling tank of a sewage purifying system, and from other tanks, and refers more specifically to means for intermittently withdrawing relatively large volumes of a predetermined quantity of liquid from such tank or tanks with a small loss of head, and to means for accurately predetermining the quantity of liquid which flows from the tank during each period of its discharge, regardless of the rate of inflow to the tank.

The invention consists in the matters hereinafter set forth and more particularly pointed out in the appended claims.

Among the objects of the invention is to provide means for producing an intermittent discharge of liquid from a tank, such as a septic or settling tank, to a distributing chamber from whence the liquid is distributed for further disposal, as, for instance, to contact or filter beds.

A further object of the invention is to provide means for withdrawing a relatively large volume of liquid from the surface of a body of liquid in a tank with a small loss of head.

A still further object of the invention, when used in connection with an automatic discharging device, as a siphon, for discharging the liquid from the distributing chamber, is to provide a rest period at the end of the intermittent discharge of liquid from the tank, during which time no liquid is discharged into the distributing chamber, thus permitting ample time after each discharge for the venting or necessary readjustment of the distributing chamber discharge device.

A still further object of the invention is to provide means for accurately determining the dose or charge of liquid to be discharged from the distributing chamber, notwithstanding the rate of inflow to the tank as compared to the rate of outflow from the distributing chamber.

Other objects of the invention will appear from the foregoing description, and the invention is set forth in claims appended hereto.

My invention is herein shown as applied to a sewage purifying system of that type embracing a distributing chamber located between the septic or settling tank and the contact or filter beds, and provided with a siphon discharge device by which the liquid discharged into the distributing chamber is distributed to said contact or filter beds; and in the following description of my invention specific reference will be made to a system of this character. It will be understood, however, that said invention is not limited to the application thereof specifically illustrated.

In the drawings:—Figure 1 is a vertical sectional view of a portion of a septic or settling tank, and a distributing chamber and its discharging equipment, taken on line 1—1 of Fig. 2 showing my improvements applied thereto. Fig. 2 is a plan view of the parts shown in Fig. 1.

As shown in the drawings, 10 designates a septic or settling tank and 11 designates a distributing chamber located at one side of and separated from the septic or settling tank by a wall 12. Said distributing chamber is equipped with discharge devices 13 for automatically controlling the discharge of liquid sewage from the distributing chamber to the contact or filter beds 13ᵃ. The form of automatic discharge device employed in the construction shown is a familiar type of deep seal siphon, the outlet end of the trap of which is adapted to discharge through a pipe or conduit 14. In practice, the distributing chamber is usually equipped with a number of such discharge siphons which operate in a predetermined order or rotation to charge a plurality of contact or filter beds, supplied from the single distributing chamber, in a manner well known to those familiar with this art.

15 designates an overhead siphon feed device for conducting or feeding the liquid sewage from the septic or settling tank 10 to the distributing chamber 11. Said feed device is located in and extends through an opening 16 in the wall 12 near the top thereof and is designed to withdraw liquid from near the surface level of the liquid in said tank. It comprises a substantially horizontal intake end 17 which opens into the said tank, a vertical outlet end 18 located within the distributing chamber, and an upwardly curved connecting part, forming within the conduit of the feed device a horizontal invert or weir 19 over which the sewage flows in its passage from said tank to the distributing chamber. Said horizontal weir 19 is located above the level of the highest part of the receiving end of the conduit of the feed device, so that when the liquid reaches the level of said weir said receiving end of the feed device is sealed against the escape of air therefrom. The conduit of the feed device is horizontally elongated, as indicated in Fig. 2 so as to provide for the delivery of a large volume of sewage through said feed device in a comparatively short time, as will hereinafter more fully appear. The upper side of the curved portion of the feed device is shown as located substantially at the level of the upper side of the wall 12.

Communicating with the interior of the feed device 15 is a trapped vent pipe, consisting of a vertical member 20 which communicates at its upper end with the interior of the feed device, and a shorter vertical pipe 21 which communicates at its lower end with the member 20 through a transverse fitting 22 and is open at its upper end to the atmosphere. As herein shown, the liquid seal of said vent pipe is forced to permit the feed device to vent by pressure transmitted to the trap of said vent pipe through a pipe 24 and a downwardly opening bell 23 located in the distributing chamber. When the feed device is so vented a flow of sewage is established through said feed device from the tank to the distributing chamber. Other forms of auxiliary trap or vent devices may be employed as best practice may dictate in each instance.

Assuming the distributing chamber to be empty and the trap of the siphon 13 to be filled, the operation of the apparatus is as follows: The liquid sewage, after it rises in the septic or settling tank to the level of the weir 19 of the feed device, flows slowly or trickles through the feed device into the distributing chamber and fills the latter to the level of the outlet end 18 of the feed device. Both ends of the feed device are at this time sealed and the device is thus air-locked to prevent the further flow of liquid therethrough. The level of the liquid in the settling or septic tank continues to rise, however, at a rate determined by the inflow to the tank, and finally flows over the wall 12 into the distributing chamber and fills said chamber to the liquid level in the septic or settling tank, or to a level required to furnish a head to bring the discharge siphon 13 of the distributing chamber into operation. At or before such level is reached in the distributing chamber, however, the pressure, due to the head in said chamber, acts through the bell 23 and pipe 24 to force or break the seal in the feed device vent pipe and to thus vent said feed device and bring it in condition to permit the flow of liquid therethrough when the contents of the distributing chamber are withdrawn. In the beginning of the withdrawal of the liquid from the distributing chamber and said tank to the contact or filter beds, the liquid flows by gravity from the tank to said chamber. After the liquid level in said chamber falls below the level of the weir 19 of the feed device the said feed device operates as a siphon to further discharge the liquid from the said tank to said chamber, and such siphonic action continues until the intake end 17 of said feed device is uncovered, whereupon the device is vented and the flow of liquid from the tank to said chamber ceases. The discharging siphon 13, however, continues to withdraw the liquid from the distributing chamber until the liquid therein is lowered to the venting level of said siphon, whereupon the operation of transferring a charge of liquid from the tank to the contact or filter bed is completed. The sealed vent pipe of the feed device is forced or blown at a time when the end 21 of said vent pipe is submerged, thereby providing means for refilling the trap of said vent pipe and insuring that the pipe will be sealed in the next operation of the feed device. After each complete operation of transferring a charge of liquid to the contact or filter bed, the flow of liquid through the feed device to the distributing chamber will not be resumed until the liquid has again risen in the tank above the level of the weir 19 of the feed device, during which period the siphon 13 has had ample time to discharge the contents of the distributing chamber and to be thoroughly vented.

The charge or dose of liquid discharged upon a contact or filter bed in each operation of the apparatus described is equal the capacity of the distributing chamber, plus the volume of liquid in the tank between the limits of the upper and lower levels therein, plus the inflow of liquid to said tank during the time liquid is flowing from the tank to the chamber through said feed device. The capacity of the contact or filter beds is proportioned to receive the aggregate volumes of liquid mentioned, and the construction and operation of the apparatus is such as to insure that this predetermined volume of liquid, and no more, shall be discharged upon a contact or filter bed in each operation of the device.

Heretofore it has been a common practice to interpose between the septic or settling tank and a plurality of contact or filter beds a dosing chamber of such capacity as to receive a charge or dose of liquid sewage of sufficient volume to fill a contact or filter bed, and to periodically discharge the contents of the dosing chamber upon said beds in a predetermined rotation or order through the medium of siphons or like automatically controlled discharging devices. In accordance with such prior practice, the liquid sewage passes with a non-distributing flow from the septic or settling tank to the dosing chamber over a fixed weir at a rate determined by the inflow into the septic or settling tank. In the prior constructions, it may occur that the rate of constant inflow to the dosing chamber from the septic or settling tank is greater than the rate of outflow therefrom through the siphons or like discharging devices, especially during the latter part of the discharging operation, in which the outflow rate decreases as the liquid head in the dosing chamber is lowered. In such event, under prior practice, opportunity may not be given for the proper venting of the siphon, and the siphon may continue to discharge liquid upon the contact or filter bed after a proper or full charge has been delivered thereto. In the present construction, however, the dose or charge of liquid to be delivered to the contact or filter beds is accurately measured and is not substantially modified or interfered with by a variable rate of flow to the septic or settling tank. Ample time is thus given for the full and complete venting of the discharge siphons and the predetermined rotative order of said siphons is maintained to deliver accurate charges or doses of liquid to the contact or filter beds.

It will be obvious that if no provision be made for the overflow of the liquid sewage from the septic or settling tank to the distributing chamber over the wall 12, the increasing head on the intake side of the feed device may be made to establish the flow of liquid through the feed device without the employment of the sealed auxiliary venting device shown. Such suggested arrangement would, however, result in a further loss of head and may for such reason not be practicable in all cases. Other changes in the construction and arrangement in the apparatus may be made without departure from the spirit of my invention. In some instances where the fall between the septic or settling tank and distributing chamber is sufficient, the outlet end of the feed device may be submerged in a maintained body of liquid contained in a sump or well in the distributing chamber, or otherwise conveniently located, in the same manner as shown in my application for U. S. Letters Patent, filed of even date herewith, Serial No. 429,254. In such an arrangement no flow of liquid from the septic or settling tank would take place through the feed device until the head, due to the rise of the liquid in the tank, were sufficient to force the seal of the vent pipe of the feed device or to force the seal of the feed device itself.

I claim as my invention:—

1. The combination with a tank, of an overhead siphon feed device for intermittently withdrawing surface liquid from a body of liquid in said tank, and a chamber into which the feed device discharges, the outlet end of said feed device being adapted to be sealed by the liquid contents of said chamber.

2. The combination with a tank, of an overhead siphon feed device for intermittently withdrawing surface liquid from a body of liquid in said tank, a chamber into which the feed device discharges, the outlet end of said feed device being adapted to be sealed by the liquid contents of said chamber, and an auxiliary venting device, controlled by the rise of the liquid, for venting said feed device.

3. The combination with a tank, of an overhead siphon feed device for intermittently withdrawing surface liquid from a body of liquid in said tank, a chamber into which said feed device discharges and in which the level of the liquid rises and falls, the outlet end of said feed device being adapted to be sealed by the rise of the liquid in said chamber, and means for discharging the liquid from said chamber.

4. The combination with a tank, and a chamber at the side of the tank which is separated therefrom by a wall and in which the liquid rises and falls, of an overhead siphon feed device for intermittently discharging surface liquid from said tank into said chamber, means for discharging the liquid from said chamber, the outlet end of said feed device being arranged to be sealed when the liquid rises in the chamber, thereby cutting off the flow of liquid through the feed device, and the wall between said tank and chamber being arranged to permit the liquid to overflow the same from the tank to the chamber, when the flow through the feed device is arrested, whereby the chamber is further filled, and means whereby the feed device is vented to start the flow of liquid therethrough.

5. The combination with a tank, and a chamber at the side of the tank and separated therefrom by a wall, of an overhead siphon feed device for intermittently discharging liquid from the surface of a body of liquid in said tank to said chamber, means for discharging the liquid from said chamber, the liquid rising and falling in said chamber and the outlet end of the device being arranged to be sealed when the liquid rises in the chamber, thereby cutting off the flow of liquid through the feed device, and the wall between said tank and chamber being arranged to permit the liquid to overflow the same from the tank to the chamber when the flow through the feed device is arrested, whereby the chamber is further filled, and an auxiliary vent device for said feed device operated by the rise of liquid in said chamber.

6. In a sewage purifying system, the combination with a septic or settling tank, and a distributing chamber provided with means for controlling the discharge of the contents thereof upon a contact or filter bed, of an overhead siphon device for intermittently feeding the liquid sewage from the septic or settling tank to said distributing chamber.

7. In a sewage purifying system, the combination with a septic or settling tank and a distributing chamber provided with means for controlling the discharge of the contents thereof upon a contact or filter bed, of an automatic feed device for intermittently feeding liquid sewage from said tank to said chamber provided with a discharge end which is adapted to be sealed by liquid in said distributing chamber.

8. In a sewage purifying system, the combination with a septic or settling tank and a distributing chamber provided with means for controlling the discharge of the contents thereof upon a contact or filter bed, of a feed device for feeding the liquid sewage from said tank to the chamber, and means for air locking said feed device whereby the flow of the liquid therethrough is intermittent.

9. In a sewage purifying system, the combination with a septic or settling tank and a distributing chamber provided with means for controlling the discharge of the contents thereof upon a contact or filter bed, of a feed device for feeding liquid sewage from said tank to said chamber, means for air locking said feed device, and means controlled by the level of the sewage being handled for venting said feed device.

10. In a sewage purifying system, the combination with a septic or settling tank and a distributing chamber provided with automatic means for controlling the discharge of the contents thereof upon a contact or filter bed, of a feed device for feeding the liquid sewage from said tank to said distributing chamber provided with a downwardly extending outlet end adapted to be sealed by the liquid sewage in the chamber, and with an inlet end which opens into said tank, said feed device being provided between said inlet and outlet ends with a weir located above the level of the highest part of said inlet end.

11. In a sewage purifying system, the combination with a septic or settling tank and a distributing chamber provided with automatic means for controlling the discharge of the contents thereof upon a contact or filter bed, of a feed device for feeding the liquid sewage from said tank to said distributing chamber provided with an outlet end adapted to be sealed by the liquid sewage in the chamber and with an inlet end which opens into said tank, said feed device being provided between said inlet and outlet ends with a weir located above the level of the highest part of said inlet end, and an auxiliary venting device communicating with said feed device.

12. The combination with a septic or settling tank and a distributing chamber provided with automatic means for controlling the discharge of the contents thereof upon a contact or filter bed, of a siphonic feed device for feeding liquid sewage from the septic or settling tank to said chamber.

13. In a sewage purifying system, the combination with a septic or settling tank, a distributing chamber and a siphon through which the contents of said chamber is discharged, of an automatic feed device for feeding liquid sewage from the septic or settling tank to said chamber provided with an outlet end which is adapted to be sealed by liquid in said distributing chamber.

14. The combination with a septic or settling tank, a distributing chamber and a siphon through which the contents of said chamber is discharged, of an overhead siphon feed device for feeding liquid to said chamber from the surface of a body of liquid in the tank, means for air locking said feed device, and means controlled by the level of the liquid sewage in said chamber for venting said feed device.

In testimony that I claim the foregoing as my invention I affix my signature in the presence of two witnesses, this 15th day of April A. D. 1908.

SAMUEL FISHER MILLER.

Witnesses:
 W. L. HALL,
 G. R. WILKINS.